A. J. MICHEL.
Billiard and other Table-Levelers.
No. 169,281. Patented Oct. 26, 1875.
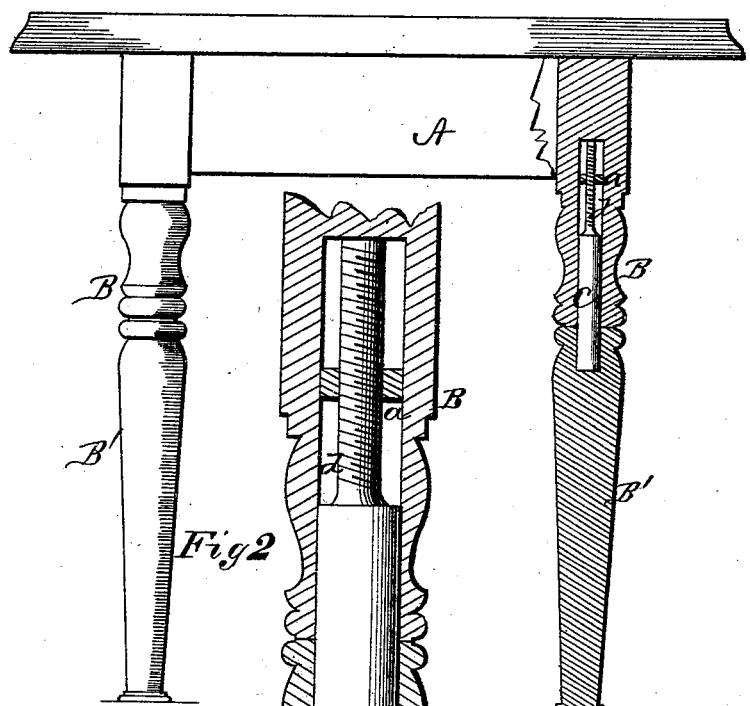
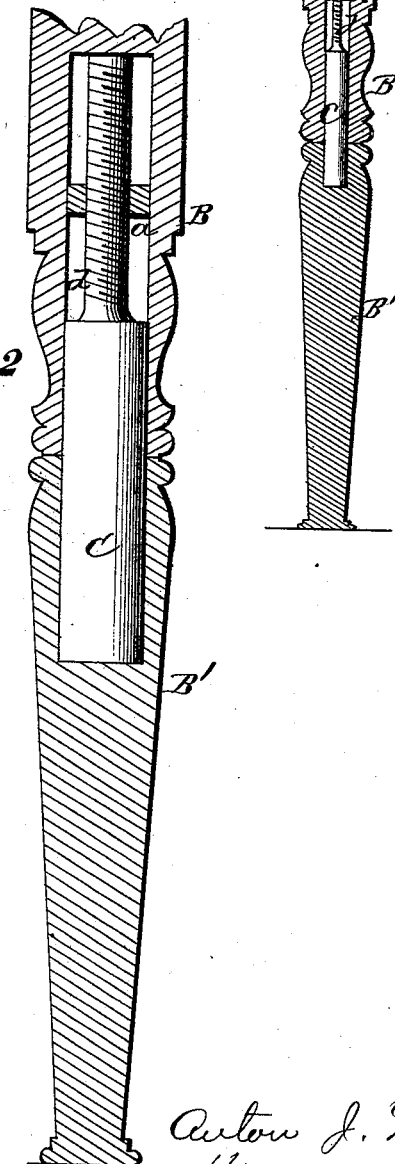
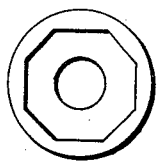
WITNESSES
Franck L. Ourand
C. L. Enoch
INVENTOR
Anton J. Michel
By Alexander Mator
Attorney

UNITED STATES PATENT OFFICE.

ANTON J. MICHEL, OF ST. LOUIS, MISSOURI.

IMPROVEMENT IN BILLIARD AND OTHER TABLE LEVELERS.

Specification forming part of Letters Patent No. 169,281, dated October 26, 1875; application filed June 8, 1875.

*To all whom it may concern:*

Be it known that I, ANTON J. MICHEL, of St. Louis, in the county of St. Louis and in the State of Missouri, have invented certain new and useful Improvements in Levelers for Tables; and do hereby declare that the following is a full, clear, and exact description thereof, reference being had to the accompanying drawings and to the letters of reference marked thereon, making a part of this specification.

The nature of my invention consists in the construction of a leveler for tables or furniture, the legs being made in two parts, one part being provided with a nut and the other with a screw-bolt, for the purpose of making legs which can be shortened or lengthened at will, as will be hereinafter more particularly set forth.

In the figures, Figure 1 represents a side view of a table with one leg shown in section. Fig. 2 is a longitudinal section of a leg. Fig. 3 is a view of the nut concealed within the hollow part of the leg.

In the drawings, A represents a table, which may be constructed in any of the well-known and usual ways. B and B' represent the table-leg in two parts. A vertical hole is bored in each part from the point where the two join, and a nut, $a$, with suitable thread in it, is inserted and secured in one of these holes, and a bolt with thread upon its upper end, (when placed in the lower section,) with thread to correspond, is inserted and secured in the other. The bolt is formed of a cylindrical part, C, secured in the part B' of the leg, and projects a suitable distance above the same, and has the screw $d$ at its upper end. When the bolt enters the nut the two parts of the leg are of course secured together, and the leg may be lengthened or shortened, so that the surface of the table can be leveled when placed upon an uneven floor. When the leg is extended the screw $d$ is not visible, the cylindrical part C forming, as it were, a connection between the two parts of the leg.

This improvement may be applied to chairs or billiard-tables, or any other class of furniture.

It will be seen with my invention that when the part B' of the leg is drawn out or lengthened, the screw, being always concealed, is not liable to become clogged with rust, dirt, &c., and the solid part of the cylinder only being exposed, the general appearance and finish of the leg itself is not marred.

Having thus fully described my invention, what I claim as new, and desire to secure by Letters Patent, is—

The combination, with a table-leg made in two parts, B B', bored out as described, of the nut $a$, concealed within the part B, and the bolt consisting of the cylindrical part C and screw $d$, also concealed within the part B, substantially as and for the purposes herein set forth.

In testimony that I claim the foregoing I have hereunto set my hand this 29th day of April, 1875.

ANTON J. MICHEL.

Witnesses:
JOSEPH DIEMEST,
WILLIAM KEATING.